(12) United States Patent
Kruedener et al.

(10) Patent No.: US 10,161,173 B2
(45) Date of Patent: Dec. 25, 2018

(54) DEVICE FOR DAMPING MOVEMENT (71) Applicant: GRASS GMBH & CO. KG, Reinheim (DE)

(72) Inventors: Boris Kruedener, Darmstadt (DE); Gabriele Schneider, Fränkisch-Crumbach (DE)

(73) Assignee: Grass GmbH & Co. KG, Reinheim (DE)

( * ) Notice: Subject to any disclaimer, the term of this patent is extended or adjusted under 35 U.S.C. 154(b) by 34 days.

(21) Appl. No.: 15/279,968

(22) Filed: Sep. 29, 2016

(65) Prior Publication Data

US 2017/0037668 A1 Feb. 9, 2017

Related U.S. Application Data

(63) Continuation of application No. PCT/EP2015/052112, filed on Feb. 3, 2015.

(30) Foreign Application Priority Data

Feb. 3, 2015 (DE) .................... 20 2014 101 503 U (51) Int. Cl.
*F16F 9/12* (2006.01)
*E05F 5/10* (2006.01)
(Continued)

(52) U.S. Cl.
CPC ................ *E05F 3/14* (2013.01); *A47B 96/00* (2013.01); *E05F 5/00* (2013.01); *E05F 5/10* (2013.01);
(Continued)

(58) Field of Classification Search
CPC ... A47B 96/00; F16F 9/145; F16F 9/12; F16F 13/00; E05F 5/10; E05F 3/14; E05F 5/00
See application file for complete search history.

(56) References Cited

U.S. PATENT DOCUMENTS 6,230,450 B1 5/2001 Kuroda et al.
6,378,594 B1 * 4/2002 Yamanaka ................ E06B 9/80
160/238

(Continued)

FOREIGN PATENT DOCUMENTS

DE 101 63 021 A1 11/2002
DE 10 2006 051 688 A1 5/2008
(Continued)

OTHER PUBLICATIONS

German Search Report (Application No. 20 2014 101 503.5) dated Apr. 7, 2014.
(Continued)

*Primary Examiner* — Thomas J Williams
*Assistant Examiner* — James K Hsiao
(74) *Attorney, Agent, or Firm* — Burr & Brown, PLLC (57) ABSTRACT

A device for damping movement, in particular, of a movable furniture part, having a bearing housing, is proposed. According to the invention, a movement absorber is mounted so as to be movable on the bearing housing and a rotary element is mounted so as to be rotatable, comprising gearbox means by way of which a movement of the movement absorber is convertible to a rotary movement of the rotary element, wherein the bearing housing has a chamber into which at least a plunger portion of the rotary element reaches, wherein a damping fluid is present in the chamber.

19 Claims, 5 Drawing Sheets

(51) Int. Cl.
*F16F 13/00* (2006.01)
*E05F 3/14* (2006.01)
*E05F 5/00* (2017.01)
*A47B 96/00* (2006.01)

(52) U.S. Cl.
CPC ........ *F16F 9/12* (2013.01); *A47B 2210/0094* (2013.01); *A47B 2220/0061* (2013.01); *F16F 13/007* (2013.01); *F16F 2230/0064* (2013.01)

(56) References Cited

U.S. PATENT DOCUMENTS

| | | | |
|---|---|---|---|
| 6,666,306 B2 | 12/2003 | Gasser | |
| 7,104,691 B2* | 9/2006 | Chi | A47B 88/467 312/319.1 |
| 7,641,296 B2* | 1/2010 | Le | A47B 88/467 312/319.1 |
| 9,810,012 B2* | 11/2017 | Bacchetti | E05F 3/104 |
| 2002/0096405 A1* | 7/2002 | Gasser | F16F 7/08 188/82.1 |
| 2003/0141638 A1* | 7/2003 | Salice | E05F 1/16 267/34 |
| 2003/0213663 A1* | 11/2003 | Salice | E05F 5/02 188/284 |
| 2006/0207843 A1* | 9/2006 | Migli | E05F 5/02 188/282.1 |
| 2007/0114896 A1* | 5/2007 | Orita | E05F 1/16 312/334.14 |
| 2007/0240280 A1* | 10/2007 | Vallance | E05F 5/00 16/82 |
| 2008/0245630 A1* | 10/2008 | Le | F16F 9/064 188/280 |
| 2008/0265729 A1* | 10/2008 | Netzer | A47B 95/043 312/330.1 |
| 2009/0108510 A1 | 4/2009 | Wang et al. | |
| 2009/0241289 A1* | 10/2009 | Choi | E05F 3/20 16/275 |
| 2010/0038196 A1 | 2/2010 | Krammer | |
| 2010/0108150 A1* | 5/2010 | Ford | F04B 47/02 137/14 |
| 2010/0270113 A1* | 10/2010 | Ogawa | A47K 13/12 188/281 |
| 2011/0136650 A1* | 6/2011 | Ellingboe | A61M 1/3693 494/76 |
| 2011/0191982 A1* | 8/2011 | Vallance | E05F 5/00 16/82 |
| 2011/0214253 A1* | 9/2011 | Talpe | E05F 3/14 16/58 |
| 2011/0232407 A1* | 9/2011 | Verhagen | F16H 25/2261 74/424.93 |
| 2012/0282094 A1* | 11/2012 | Gay | F03D 7/0228 416/44 |
| 2013/0018310 A1* | 1/2013 | Boyd | A61M 5/2448 604/110 |
| 2013/0028544 A1* | 1/2013 | Lowe | A47B 88/047 384/21 |
| 2013/0133157 A1* | 5/2013 | Kimura | E05F 3/00 16/49 |
| 2013/0182978 A1* | 7/2013 | Huang | E05F 5/003 384/21 |
| 2014/0033476 A1* | 2/2014 | Bacchetti | E05F 1/1223 16/52 |
| 2014/0075718 A1* | 3/2014 | Bacchetti | E05F 3/104 16/54 |
| 2015/0275997 A1* | 10/2015 | Burton | E05F 5/02 267/166 |
| 2016/0150880 A1* | 6/2016 | Chen | A47B 88/047 312/319.1 |
| 2016/0237730 A1* | 8/2016 | Bacchetti | E05F 1/1223 |
| 2018/0003198 A1* | 1/2018 | Jurczyk | F15B 15/068 |

FOREIGN PATENT DOCUMENTS

| | | |
|---|---|---|
| DE | 20 2011 109 549 U1 | 5/2013 |
| WO | 2008/083417 A1 | 7/2008 |
| WO | 2011/007313 A1 | 1/2011 |

OTHER PUBLICATIONS

International Search Report and Written Opinion (Application No. PCT/EP2015/052112) dated May 29, 2015.
English translation of International Preliminary Report on Patentability (Application No. PCT/EP2015/052112) dated Oct. 13, 2016.
European Office Action (Application No. 15 703 938.9) dated Jun. 13, 2018 (with partial machine translation).

* cited by examiner

DEVICE FOR DAMPING MOVEMENT

CROSS REFERENCE TO RELATED APPLICATIONS

This application is a continuation of International Application No. PCT/EP2015/052112 filed Feb. 3, 2015, which designated the United States, and claims the benefit under 35 USC § 119(a)-(d) of German Application No. 20 2014 101 503.5 filed Mar. 31, 2014, the entireties of which are incorporated herein by reference.

FIELD OF THE INVENTION

The invention relates to a device for damping movement, in particular, of a movable furniture part.

BACKGROUND OF THE INVENTION

Devices for damping movement are known in the most varied embodiments, in particular, in the furniture construction industry. For example, a damping device may comprise two elements which are mounted so as to be movable in relation to one another and which by way of a predefined force are pushed together in a manner perpendicular to the movement direction of the elements, for example, in order for a damping effect to be provided by way of a respective static or dynamic friction effect. It is furthermore known for damping devices to comprise a cylinder having a piston guided therein, wherein passage openings through which a damping medium, for example, a gas, may flow in a correspondingly restricted manner are present in the case of a piston or between the pistons and an internal cylinder wall. In the instances of movement of the piston in relation to the cylinder, the passage openings delimit pressure equalization between the cylinder capacity ahead of and to the rear of a piston in the cylinder interior, thereby effectuating the damping effect. However, the respective damping devices have a space requirement which may be reduced by way of the present invention.

SUMMARY OF THE INVENTION

The object of the present invention thus lies in providing a device for damping movement, which while providing the same damping effect may be embodied in a comparatively space-saving manner.

The present invention proceeds from a device for damping movement, in particular, of a movable furniture part, having a bearing housing. The core concept of the present invention lies in that a movement absorber is mounted so as to be movable on the bearing housing, and in that a rotary element is rotatably mounted in the bearing housing, and in that the device has gearbox means by way of which a movement of the movement absorber is convertible to a rotary movement of the rotary element, wherein the bearing housing has a chamber into which at least a plunger portion of the rotary element reaches, wherein a damping fluid is present in the chamber. The gearbox means are preferably disposed in and/or on the bearing housing, wherein the former may be mounted directly and/or indirectly in or on the bearing housing, respectively. The chamber of the bearing housing in which the damping fluid is present, together with the plunger portion of the rotary element, is preferably provided for damping a movement of the movement absorber. To this end, the movement absorber is preferably coupled to the rotary element by way of the gearbox means.

The intermediate space of parts which are movable, in particular, rotatable, in relation to one another, of an internal wall of the chamber and of the plunger portion of the rotary element may be completely filled with the damping medium, for example. However, the presence of the damping fluid may also lie in that the chamber and the plunger portion, in the case of a mutually relative movement, convey the damping fluid through the intermediate space.

The damping fluid may, for example, be a viscous liquid, for example, an oil or a dispersion. The device according to the present invention offers the advantage that a shear stress, by way of which a damping force is capable of being generated, may be maintained in a liquid in a comparatively small space by a rotary movement in a perpetual movement range, so to speak. The intermediate space, for example, between an internal wall of the chamber and an external face of the plunger portion or of the rotary element, respectively, preferably extends in a radial direction so as to be perpendicular to the rotation axis of the rotary element, as a correspondingly high shear stress is capable of being generated in the damping fluid by way of a comparatively large speed differential between the chamber wall and the plunger portion. Moreover, an intermediate space that is predominantly disposed between end faces of the chamber and of the plunger portion, and which are mutually opposed in the axial direction in relation to the rotary axis, may be provided for the damping fluid.

The damping fluid in the chamber preferably embodies an intermediate space between an external face of the plunger portion and an internal face of the chamber.

One preferred embodiment of the present invention lies in that a cross section of the internal face of the chamber has an irregular curvature about a geometric center. An irregular curvature may be configured in the form of a corner or an edge on the internal face of the chamber, for example. When the plunger portion of the rotary elements rotates in relation to the chamber, the irregular curvature of the inner face of the chamber may cause an increased flow velocity at points, for example, by a cross-sectional constriction or, for example, by turbulence. Herein, a cross section of the chamber that is perpendicular to the rotation axis may be shaped so as to be polygonal, in particular, as a regular polygon, for example. Furthermore, the internal face of the chamber may have a thread-type surface profile, in order to achieve an additional increase in the shear stress by way of a flow component of the damping fluid that runs transversely to the rotary movement of the rotary element, for example. A back pressure within the chamber may also be advantageously generated herein.

In a corresponding manner, a cross section of the plunger element that lies transversely, in particular, perpendicularly, to the rotation axis may have an irregular curvature about the rotation axis, so as to advantageously achieve similar effects as by way of an irregularly curved internal face of the chamber.

One further preferred embodiment of the present invention lies in that the rotary element, and, in particular, the plunger portion, in particular, the rotation axis thereof, is disposed so as to be eccentric to a symmetry axis of the internal face of the chamber, wherein the symmetry axis lies so as to be, in particular, parallel with the rotation axis. In this manner, an annular intermediate space having dissimilar or variable widths, respectively, even in the case of circular cross sections may be configured. The eccentric arrangement of the rotation axis in relation to the symmetry axis of the chamber herein enables a symmetrical behavior in terms of the rotation directions of the plunger portion within the chamber.

The gearbox means may comprise a gearbox element which is mounted so as to be rotatable in relation to the bearing housing and which is coupled to the rotary element in a rotationally fixed manner. On account thereof, movements of the movement absorber in opposite directions are dampable.

One preferred embodiment of the present invention provides that the gearbox means comprise a gearbox element which is mounted so as to be rotatable in relation to the bearing housing and which by way of a free-wheeling clutch is coupled to the rotary element in such a manner that a higher torque is transmittable from the gearbox element to the rotary element in a predefined direction of rotation than in a direction of rotation that is counter thereto. The free-wheeling clutch is preferably configured in such a manner that a torque is transmittable here in the predefined direction of rotation, whereas there is no damping and the damping fluid is not effective in the direction of rotation that is counter thereto. For example, when the movement absorber is not permanently connected to a movable furniture part that is to be damped, this embodiment offers the advantage that the movement absorber, for example, in the case of a closing movement, may transmit damping forces to the furniture part and, in the case of an opening movement, may nevertheless follow the furniture part in a comparatively rapid manner. In principle, the device may also comprise a free-wheeling clutch of a type that enables transmission of force only in one predefined linear direction of force. To this end, the free-wheeling clutch may be configured in the form of a ratchet, for example, having a series of saw teeth and a movable latch bearing thereon.

In order for space for further gearbox elements to be provided within the bearing housing, for example, the gearbox element may have a hollow-cylindrical portion which is disposed so as to be parallel with the rotation axis.

The movement absorber is preferably a tappet which on an end side of the bearing housing is alternatingly deployable and retractable on a predefined movement path on the bearing housing. The movement path is preferably rectilinear. Furthermore, the movement path may run in a curved manner, for example, in the shape of a circular arc. In order to avoid that the movement absorber has to be held within the bearing housing by a furniture part, the device preferably has a stop which delimits a deploying movement of the movement absorber. Moreover, a retracting movement of the movement absorber may be delimited by a stop on the device.

In order to avoid that the movement absorber, in particular, the tappet, over a comparatively long usage period drills into a surface of a movable furniture part, it is preferable that a guide portion on which the tappet is movable in an opposite direction along a predefined movement path is configured on the bearing housing, wherein a rotary movement of the tappet about a movement path, in particular, in relation to the bearing housing, is blocked. The guide portion moreover offers the advantage that a torque may be generated by moving the tappet, said torque driving the rotary element only in the case of rotation and suppressing a rotary countermovement of the tappet.

For an advantageously space-saving generation of a rotary movement for driving the rotary element, the gearbox means comprise a helical guide gate.

An advancing and returning movement of the movement absorber along the predefined movement path may thus advantageously be converted to a rotary movement for driving the rotary element in a space-saving manner.

Furthermore, the gearbox means may comprise a second guide gate which has a guide profile running in parallel along the rotation axis. For example, the guide profile may be configured as a slot-shaped breakthrough in the wall of a hollow cylinder, for example, in a gearbox element. A rotary countermovement of a driving part in the drive of the rotary element may thus be avoided.

The gearbox means preferably comprise an entrainment element which may engage in the helical guide gate. The entrainment element herein may be provided for driving the helical guide gate. For example, in that the entrainment element is connected to the movement absorber, in particular, in a fixed manner. The entrainment element may likewise be connected to the rotary element in a rotationally fixed manner and by way of a linear movement of the guide gate along the helix axis set the entrainment element and the rotary element in rotation.

The entrainment element may be a pin which is attached to a fixed position on the movement absorber, in particular, on the tappet. The pin herein may laterally protrude on the tappet, herein engaging in the first, optionally in the second guide gate. The pin herein drops in movements of the movement absorber, in particular, of the tappet.

The helical guide gate may be configured on the gearbox element, for example.

Furthermore, the guide profile that runs in parallel with the rotation axis, that is to say the second guide profile, may be configured on the gearbox element.

Furthermore, the first guide gate or the second guide gate may be fixedly connected to the bearing housing.

The damping fluid is preferably a non-Newtonian fluid, in particular, a shear-thickening fluid. This offers the advantage that a user may perceive in a comparatively rapid manner by way of the non-linear damping behavior of the device when there is an increased risk of overloading the damping device.

Because the device according to the present invention may be constructed in a comparatively compact manner, there is more available space on an item of furniture that is equipped with the present invention. Furthermore, the device according to the present invention is visually less prominent on an item of furniture that is equipped with the former.

BRIEF DESCRIPTION OF THE DRAWINGS

The present invention will be described hereunder by way of a plurality of exemplary embodiments and explained with the aid of the drawings. The drawings are not to scale. Mutually equivalent features in the figures are uniformly identified using the same reference signs.

DETAILED DESCRIPTION OF THE INVENTION

Figure 1:
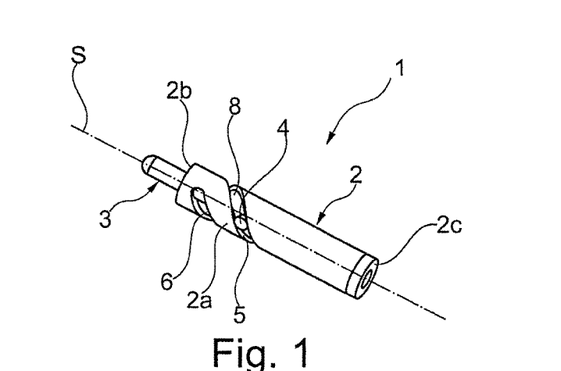
FIG. 1 shows a schematic perspective view of a damper according to the present invention.
Figure 2:
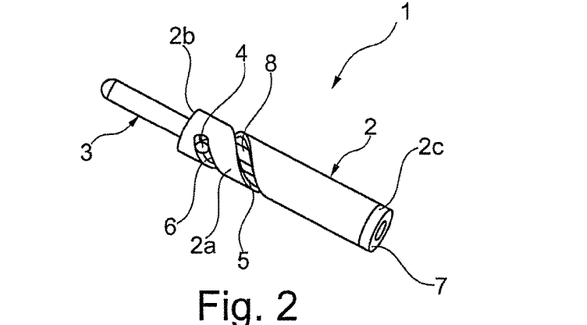
FIG. 2 shows a schematic perspective view of the damper having a deployed tappet.

A first exemplary embodiment of a damper 1 according to the present invention, which comprises a housing 2 and a tappet 3 which is displaceable in the latter, is shown in FIG. 1. Within the bearing housing 2, a pin 4 which engages in a helical guide gate 5 protrudes laterally on the tappet 3 and thus so as to be perpendicular to the longitudinal axis of the tappet 3. The gate guide 5 herein is configured in the form of the slot-shaped breakthrough on a hollow-cylindrical housing portion 2a of the bearing housing 2. In particular, the pin 4 laterally protrudes on opposite sides of the tappet 3, for example, on account of which the pin 4 may engage in a second helical guide gate 6 on the housing portion 2a, wherein the guide gate 6 in relation to the guide gate 5 runs in parallel therewith, rotated by 180° about the longitudinal axis of the bearing housing.

The bearing housing 2 is configured so as to be substantially cylindrical, wherein the tappet is retractable and deployable on an end side 2b. The bearing housing at an opposite end side 2c is closed off by a bearing element 7.

Figure 3:
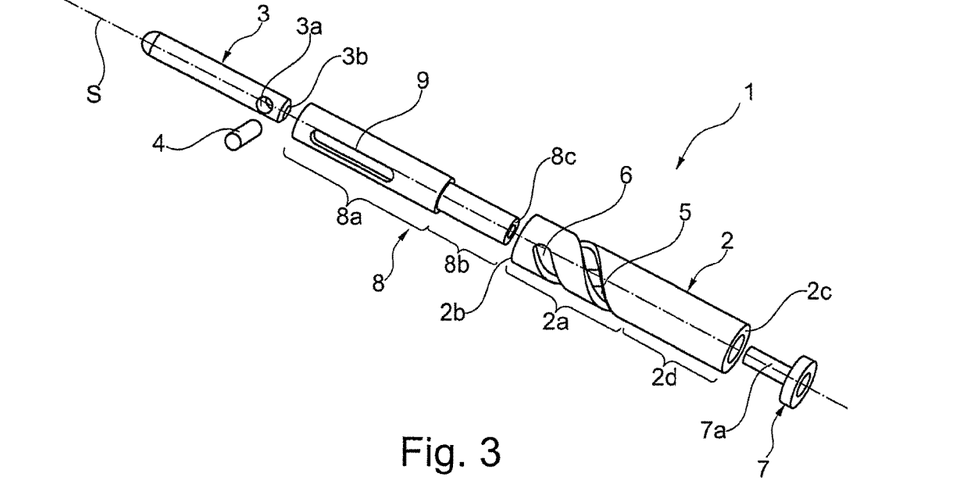
FIG. 3 shows a schematic perspective exploded view of the damper.

It can be derived from FIG. 3 that the damper 1 comprises a rotary element 8 which is rotatable about the rotation axis S and is mounted in the bearing housing 2 so as to be concentric with said rotation axis S. A maximum external diameter of the rotary element 8 is preferably adapted to an internal diameter of the housing portion 2a of the bearing housing 2 in such a manner that the rotary element 8 may be rotated within the bearing housing 2 with comparatively little play of movement and with comparatively little friction. The rotary element 8 may extend across an entire length of the longitudinal axis of the bearing housing 2, from the end side 2b to the end side 2c, for example.

The rotary element 8 has a hollow-cylindrical sleeve portion 8a in which the tappet 3 is displaceable in parallel with the rotation and symmetry axis S.

A plunger portion 8b, which in relation to the external diameter of the sleeve portion 8a may have a reduced diameter, for example, adjoins the rotary element 8 along the axis S on the sleeve portion 8a. The plunger portion 8b, perpendicular to the axis S, has a cross section, a regular symmetrical hexagon, which is disposed so as to be concentric with the central symmetry axis S of the rotary element 8. In a manner likewise concentric with the central axis S of the rotary element 8, a bore 8c leads from one end of the rotary element 8 into the rotary element 8. The bore 8c is provided so that a bearing pin 7a of the bearing element 7, that protrudes into the bearing housing 2, may protrude into the rotary element, in particular, into the plunger portion 8b.

A rectilinear guide gate 9 in the form of a slot-shaped breakthrough is configured on the sleeve portion 8a of the rotary element 8. The internal diameter of the sleeve portion 8a and the external diameter of the tappet 3 are mutually adapted in such a manner that the tappet 3 in the sleeve element 8a in the direction of the symmetry axis and concentrically with the central rotation axis of the rotary element 8 is movable in and out with comparatively little play of movement. A bore 3a, through which the pin 4 may be plug-fitted and preferably be fixed to the tappet 3, is configured on the tappet 3, on an end portion 3b of the tappet 3, so as to be perpendicular to the longitudinal axis S of the tappet 3. Herein, the pin 4 protrudes laterally on the tappet 3, preferably on opposite sides of the tappet 3. In an assembled state of the damper, the pin reaches through the rectilinear guide gate 9 of the rotary element 8 and into the helical gate 5 of the sleeve portion 8a of the rotary element 8. A second rectilinear guide gate (not shown) is preferably configured on the sleeve portion 8a of the rotary element 8, on account of which the pin 4 may also on an opposite side of the rotary element reach through the rectilinear guide gate (not shown) into the helical guide gate of the housing portion 2a.

The end portion 3b having the pin 4, the sleeve portion 8a of the rotary element 8, having, in particular, the two rectilinear guide gates configured thereon, and the housing portion 2a having the helical guide gates 5 and 6, are gearbox means by way of which an axial displacement of the tappet 3 along the axis S is convertible or transmittable, respectively, to a rotary movement of the rotary element 8 about the axis S within the bearing housing 2. In the case of a displacement of the tappet 3, for example, into the rotary element 8, the helical gate guides 5 and 6 enable an axial movement of the pin only together with a simultaneous rotation of the pin 4 about the axis S, the latter by virtue of the concentric arrangement of the tappet 3, the rotary element 8, and the bearing housing 2, at the same time forming a helical axis of the guide gates 5 and 6. When encircling the axis S, the pin 4 impacts delimitations of the axially running, slot-shaped guide gates 9, herein in the case of rotation conjointly carrying the rotary element 8, which is coupled to the sleeve portion 8a, in particular, the plunger portion 8b, about the axis S.

Figure 4:
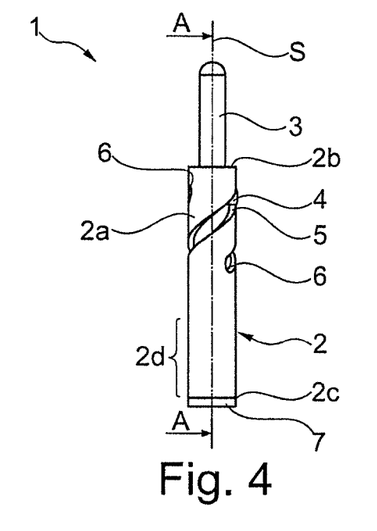
FIG. 4 shows a schematic side view of the damper.
Figure 5:
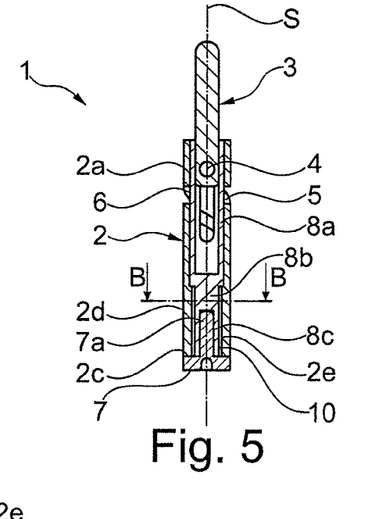
FIG. 5 shows a schematic sectional side view in a sectional plane that runs perpendicularly to the paper plane, through an axis A-A of FIG. 4.
Figure 6:
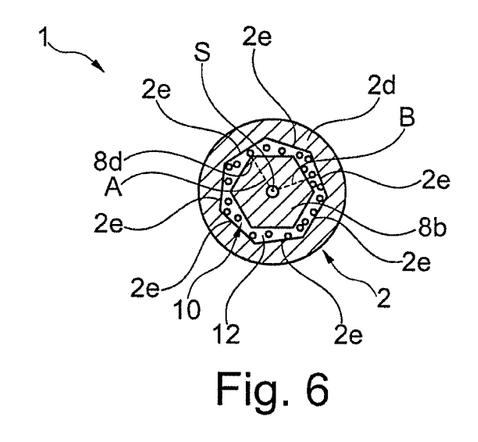
FIG. 6 shows a schematic cross section of the damper in a sectional plane that runs perpendicularly to the paper plane, through the axis B-B of FIG. 5.

The internal construction of the damper 1 in an assembled and functionally ready state can be seen by means of FIGS. 4, 5, and 6. A hollow housing portion 2d of the bearing housing extends between the sleeve portion 2a of the bearing housing and the end side 2c. Seven rectangular faces 2e of identical size, which in the radial direction, so as to be perpendicular to the axis S, delimit a chamber 10 having a regular heptagonal cross section, are disposed herein on an internal side of the portion 2d, so as to be symmetrical about the central axis S of the bearing housing 2. A minimum spacing B of each of the internal faces 2e of the sleeve element is larger than a maximum spacing A from the corner edges 8d of plunger portion 8b from the central axis S. The internal wall areas 2e herein enclose a chamber 10 into which the plunger portion 8b by way of a cross section of a regular hexagon reaches rotationally in a manner symmetrical to the central rotation axis S.

The chamber 10 is preferably at least partially filled with a damping fluid 12, the former being located in the intermediate space between the lateral faces 2e and the plunger portion 8b. Because the two regular polygonal cross sections of the internal faces 2e and of the plunger portion 8b differ by one corner, in the case of any angular position of rotation of the plunger portion 8b in relation to the internal faces 2e, at least one corner is located so as to be comparatively close to one of the internal faces 2e, on account of which a reduced flow cross section arises at the respective corner when the plunger element 8b rotates in relation to the housing portion 2d. On account thereof, comparatively high shear stresses may be elicited in the damping fluid 12, high damping forces being capable of being generated by said shear stresses. When the damping fluid is a non-Newtonian, in particular, a shear-thickening liquid, or a dispersion, the chamber 10 by way of a comparatively small capacity may achieve a desired damping effect.

Figure 7:
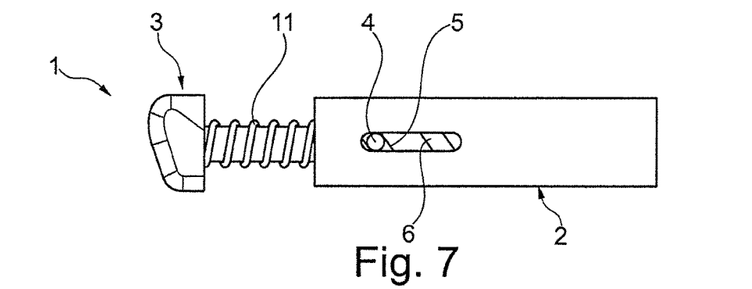
FIG. 7 shows a schematic side view of a second embodiment of a damper according to the present invention.
Figure 8:
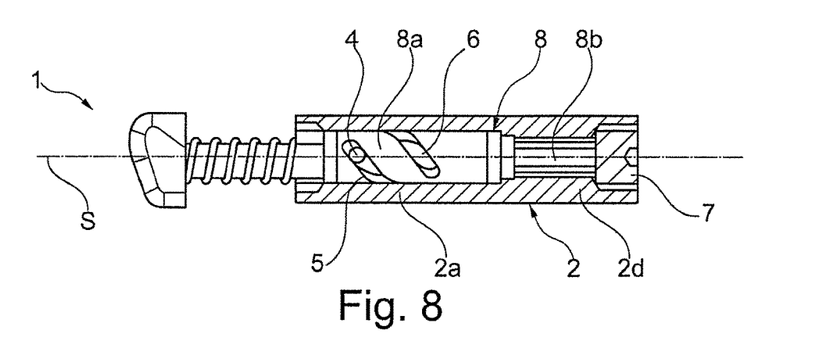
FIG. 8 shows a schematic sectional side view of the bearing housing of the damper.
Figure 9:
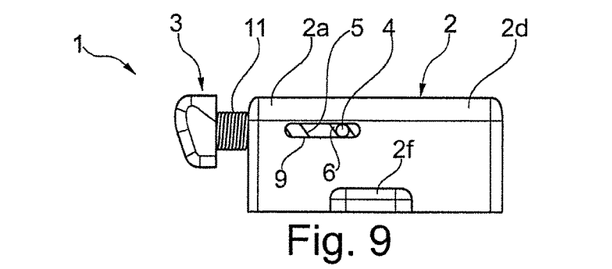
FIG. 9 shows a schematic side view of a third embodiment of a damper according to the present invention.
Figure 10:
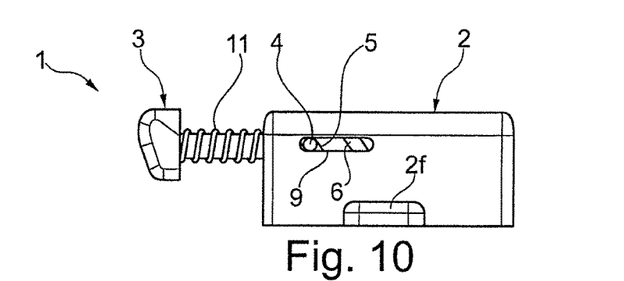
FIG. 10 shows a schematic side view of the damper having a deployed tappet.
Figure 11:
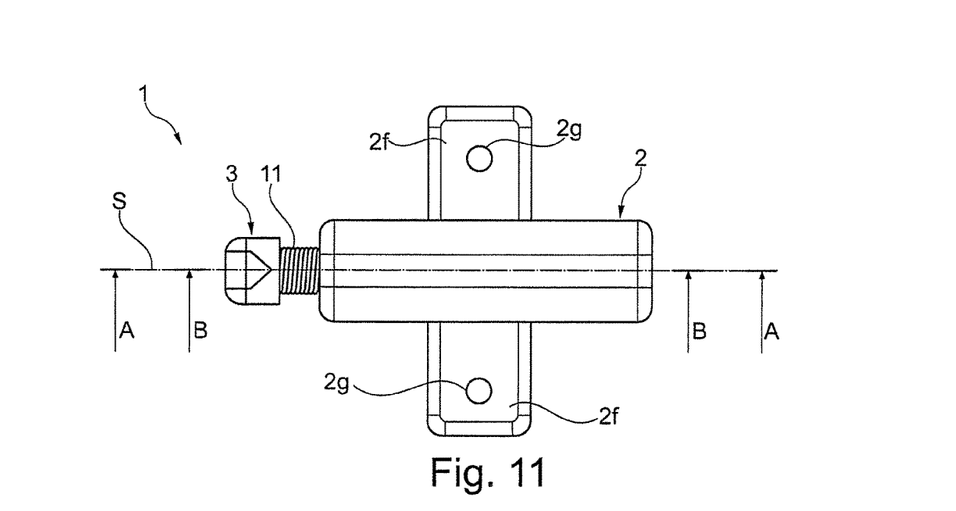
FIG. 11 shows a schematic view from above of the damper.

A second exemplary embodiment of a damper 1 according to the present invention is shown in FIGS. 7 and 8. As in the previous example, a tappet 3 is mounted so as to be rectilinearly displaceable in a bearing housing 2. The damper has a spring 11 which exerts a compression force in the direction of a deployed initial position on the tappet 3, as is shown in FIGS. 7 and 8. The damper 1 in terms of substantial features is identical to the exemplary embodiment described above, only a substantial point of difference being therefore explained hereunder.

A rectilinear guide gate 9 in the form of a slot-shaped breakthrough is configured on the damper 1 on the bearing housing 2. Furthermore, helical guide gates 5 and 6 in the form of slot-shaped breakthroughs are configured on a sleeve portion 8a of a rotary element 8. Because the tappet 3 is guided by the guide gate 9 on the bearing housing 2 on a straight path, the damper 1 has only the rotary element 8 as a rotating element. On account thereof, a rotating conjoint movement of the tappet 3 may be advantageously avoided.

A third exemplary embodiment of a damper 1 according to the present invention is shown in FIGS. 9 to 17. The damper 1 has a bearing housing 2 on which plate-shaped attachment portions 2f project on opposite sides of the bearing housing 2. A bore 2g, by way of which the damper may be attached, in particular, screw-fitted, to a furniture part is present on each of the attachment portions 2f.

The damper 1 shown in FIGS. 9 to 17 has numerous features that are identical to those of the previously described, second exemplary embodiment, only features deviating therefrom therefore being discussed hereunder.

Figure 12:
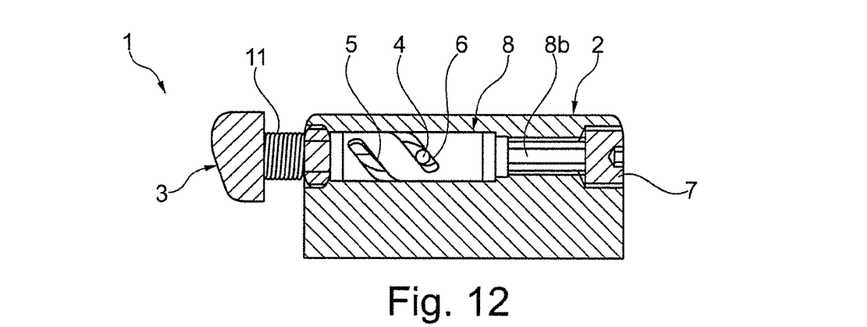
FIG. 12 shows a schematic sectional side view of a bearing housing of the damper in a sectional plane that runs perpendicularly to the paper plane, through the axis A-A in FIG. 11.
Figure 13:
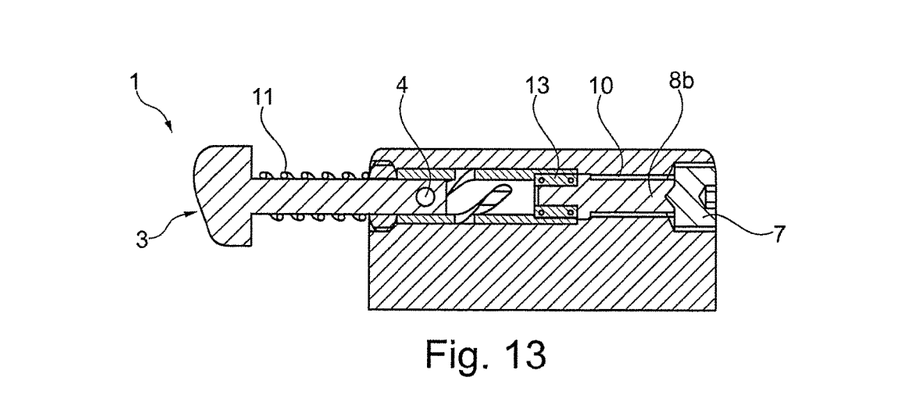
FIG. 13 shows a schematic sectional side view of the damper in a sectional plane that runs perpendicularly to the paper plane, through the axis B-B in FIG. 11.
Figure 14:
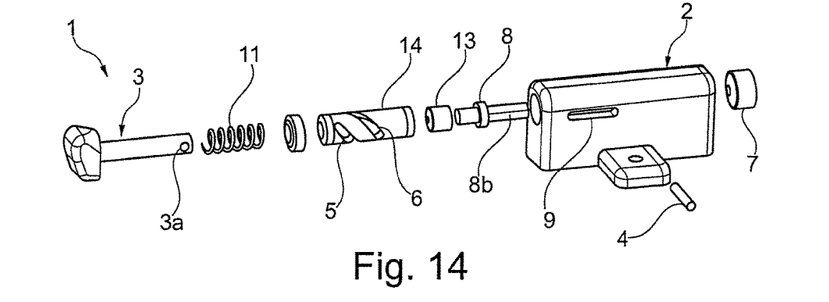
FIG. 14 shows a schematic perspective exploded view of the damper.
Figure 15:
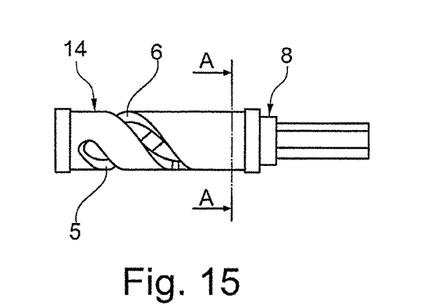
FIG. 15 shows a schematic side view of a gearbox element and of a rotary element.
Figure 16:
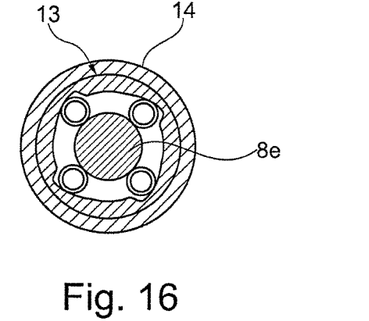
FIG. 16 shows a schematic view of a cross section of the gearbox element in a sectional plane perpendicular to the paper plane, on the axis A-A of FIG. 15.
Figure 17:
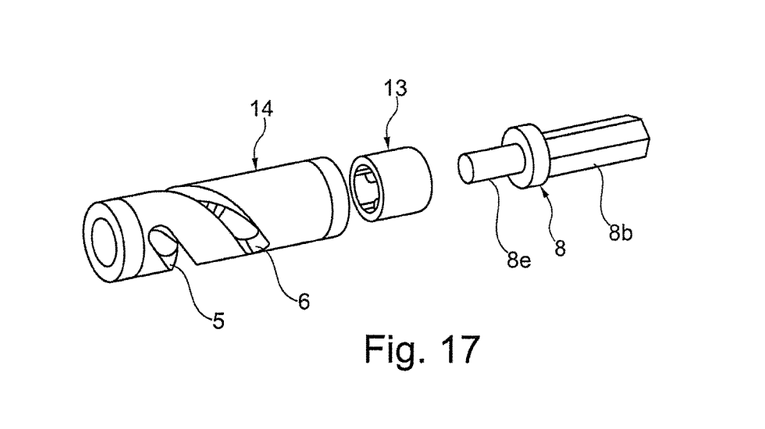
FIG. 17 shows a schematic perspective exploded view of the gearbox element having a free-wheeling feature and a rotary element.

The damper 1 comprises a rotary element 8 having a plunger portion 8b which in a chamber 10 of the bearing housing 2 may be plunged into a damping fluid 12. The rotary element 8 by way of a cylindrical plug portion 8e is coupled to a free-wheeling clutch 13, wherein the plug portion reaches into the free-wheeling clutch 13 in a concentric manner.

LIST OF REFERENCE SIGNS

1 Damper
2 Bearing housing
2a Housing portion
2b End side
2c End side
2d Housing portion
2e Wall area
2f Attachment portions
2g Bore
3 Tappet
3a Bore
3b End portion
4 Pin
5 Guide gate (helical)
6 Guide gate (helical)
7 Bearing element (circular cover-shaped)
7a Bearing pin
8 Rotary element
8a Sleeve portion
8b Plunger portion
8c Bearing bore
8d Corner edge 8e Plug portion
9 Guide gate (rectilinear)
10 Chamber
11 Spring
12 Damping fluid
13 Free-wheeling clutch
14 Gearbox element

The invention claimed is:

1. A device for damping movement comprising: a bearing housing, a movement absorber movably mounted on the bearing housing, a rotary element rotatably mounted in the bearing housing, and a gearbox adapted to convert a movement of the movement absorber to a rotary movement of the rotary element, wherein the bearing housing has a chamber into which at least a plunger portion of the rotary element reaches, a damping fluid is present in the chamber, the chamber extending in an intermediate space in a radial direction, substantially perpendicular to a rotation axis, between an internal wall of the chamber and an external face of the plunger portion of the rotary element.

2. The device as claimed in claim 1, wherein the damping fluid in the chamber fills an intermediate space between an external face of the plunger portion and an internal face of the chamber.

3. The device as claimed in claim 1, wherein a cross section of an interior of the chamber includes at least two linear portions defining a corner.

4. The device as claimed in claim 1, wherein a cross section of the plunger element that lies perpendicularly to the rotation axis defines a polygon about the rotation axis.

5. The device as claimed in claim 1, wherein the rotation axis is disposed so as to be eccentric to a symmetry axis defined by the interior of the chamber, wherein the symmetry axis is parallel with the rotation axis.

6. The device as claimed in claim 1, wherein the gearbox comprises a gearbox element, the gearbox element being rotatably mounted in relation to the bearing housing, and fixed to the rotary element.

7. The device as claimed in claim 1, wherein the gearbox comprises a gearbox element which is mounted so as to be rotatable in relation to the bearing housing and which by way of a free-wheeling clutch is coupled to the rotary element in such a manner that a higher torque is transmittable from the gearbox element to the rotary element in a predefined direction of rotation than in a direction of rotation that is counter thereto.

8. The device as claimed in claim 6, wherein the gearbox element has a hollow-cylindrical portion which is disposed so as to be parallel with the rotation axis.

9. The device as claimed in claim 1, wherein the movement absorber is a tappet which on an end side of the bearing housing is alternatingly deployable and retractable on a predefined movement path on the bearing housing.

10. The device as claimed in claim 1, wherein a guide portion on which the movement absorber is movable in opposing directions along a predefined movement path is configured on the bearing housing, wherein a rotary movement of the movement absorber about the movement path, in particular in relation to the bearing housing, is blocked.

11. The device as claimed in claim 1, wherein the gearbox comprises a helical guide gate.

12. The device as claimed in claim 11, wherein the gearbox comprises a second guide gate which has a guide profile running in parallel along the rotation axis.

13. The device as claimed in claim 1, wherein the gearbox comprises an entrainment element which may engage in the helical guide gate.

14. The device as claimed in claim 13, wherein the entrainment element is a pin which is attached to a fixed position on the movement absorber, in particular on the tappet.

15. The device as claimed in claim 11, wherein the helical guide gate is configured on the gearbox element.

16. The device as claimed in claim 12, wherein the second guide gate having the guide profile running in parallel with the rotation axis is configured on the gearbox element.

17. The device as claimed in claim 12, wherein the helical guide gate or the second guide gate is fixedly connected to the bearing housing.

18. The device as claimed in claim 1, wherein the damping fluid is a shear-thickening fluid.

19. An item of furniture having a device as claimed in claim 1.

* * * * *

UNITED STATES PATENT AND TRADEMARK OFFICE
CERTIFICATE OF CORRECTION

Page 1 of 1

PATENT NO. : 10,161,173 B2
APPLICATION NO. : 15/279968
DATED : December 25, 2018
INVENTOR(S) : Boris Kruedener and Gabriele Schneider It is certified that error appears in the above-identified patent and that said Letters Patent is hereby corrected as shown below:

On the Title Page

Foreign Application Priority Data, Item (30):
Please change: "Feb. 3, 2015 (DE)..... 20 2014 101 503 U" to -- March 31, 2014 (DE)..... 20 2014 101 503 U --

Signed and Sealed this
Nineteenth Day of February, 2019

Andrei Iancu
*Director of the United States Patent and Trademark Office*